United States Patent
Tatah et al.

(10) Patent No.: US 6,355,908 B1
(45) Date of Patent: Mar. 12, 2002

(54) METHOD AND APPARATUS FOR FOCUSING A LASER

(75) Inventors: Abdelkrim Tatah, Arlington; Xinbing Liu, Acton, both of MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/282,722

(22) Filed: Mar. 31, 1999

(51) Int. Cl.[7] .............................................. B23K 26/00
(52) U.S. Cl. ............................. 219/121.81; 219/121.83
(58) Field of Search ...................... 219/121.67, 121.68, 219/121.69, 121.7, 121.71, 121.72, 121.78, 121.81, 121.83, 121.85

(56) References Cited

U.S. PATENT DOCUMENTS

| | | | |
|---|---|---|---|
| 4,675,072 A | * | 6/1987 | Bennett et al. ............. 156/626 |
| 4,945,206 A | | 7/1990 | Arai |
| 5,231,264 A | | 7/1993 | Fujita |
| 5,340,962 A | | 8/1994 | Schmidt et al. |
| 5,521,374 A | | 5/1996 | Cray et al. |
| 5,670,773 A | * | 9/1997 | Planeix .................. 219/121.78 |
| 5,687,146 A | | 11/1997 | Murao et al. |
| 5,744,780 A | | 4/1998 | Chang et al. |
| 5,850,068 A | | 12/1998 | Peters et al. |
| 5,869,805 A | * | 2/1999 | Beyer et al. ........... 219/121.83 |
| 6,057,525 A | | 5/2000 | Chang et al. |
| 6,097,020 A | * | 8/2000 | Karasaki ..................... 250/205 |

FOREIGN PATENT DOCUMENTS

DE    3406380 A    1/1985

OTHER PUBLICATIONS

European Search Report, Jun. 25, 2001.
Liu et al., "Ultrashort laser pulses tackle precision machining," Laser Focus World, Aug. 1997.

* cited by examiner

Primary Examiner—Samuel M. Heinrich
(74) Attorney, Agent, or Firm—Ratner & Prestia

(57) ABSTRACT

A method for focusing an ultrashort pulse laser relative to a workpiece using the position of a plasma formed by a laser. A laser beam is focused to a focal point. The high peak intensity of the ultrashort pulse laser ionizes air at the focal region to form a plasma. The intensity of the plasma varies as its position relative to the workpiece varies. The intensity of the plasma formed by the focused laser beam is detected. The position of the focal point relative to the workpiece is adjusted responsive to the detected intensity of the plasma.

9 Claims, 5 Drawing Sheets

METHOD AND APPARATUS FOR FOCUSING A LASER

FIELD OF THE INVENTION

This invention relates to focusing a laser and, in particular, to adjusting the focal point of a laser by detecting the location of a plasma generated by the laser.

BACKGROUND OF THE INVENTION

Lasers are scanned for a variety of purposes including drilling holes in or otherwise machining a workpiece. For example, a laser may be used to machine glass or silicon wafers to form waveguides or microoptical structures. Laser machining is often performed by focusing a laser beam to a focal point. The focal point is a point of heightened power density which may advantageously be used for machining a workpiece. In order to use the focal point for precise machining applications, it may be necessary to precisely determine the location of the focal point so it may be accurately positioned on the workpiece.

Ultrafast lasers with pulse duration in the picosecond range and femtosecond range may be used for machining a workpiece. Ultrafast lasers may be used for precise ablation with little or no heat affected zone. They are especially suited for machining microscopic features in delicate materials such as thin films and brittle ceramics, which are otherwise difficult to machine. The focal point of ultrafast lasers must be accurately positioned for precise and accurate machining because of the small effective work area of ultrafast lasers.

The exact location of the focal point of a focused laser may be difficult to ascertain, however, due to deviations in the optical path. These deviations may be caused by abnormalities in mirrors used to direct the laser beam and in the focusing lens and by variations in the operating characteristics of the laser source. Thus, it is desirable to accurately adjust the position of the focal point with respect to the workpiece independent of variations in the laser source and the optical path.

SUMMARY OF THE INVENTION

The present invention provides a method and apparatus for focusing a laser relative to a workpiece using the position of a plasma formed by a laser. A laser beam is focused to a focal point to form a plasma. The intensity of the plasma formed by the focused laser beam is detected. The position of the focal point relative to the workpiece is adjusted responsive to the detected intensity of the plasma.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
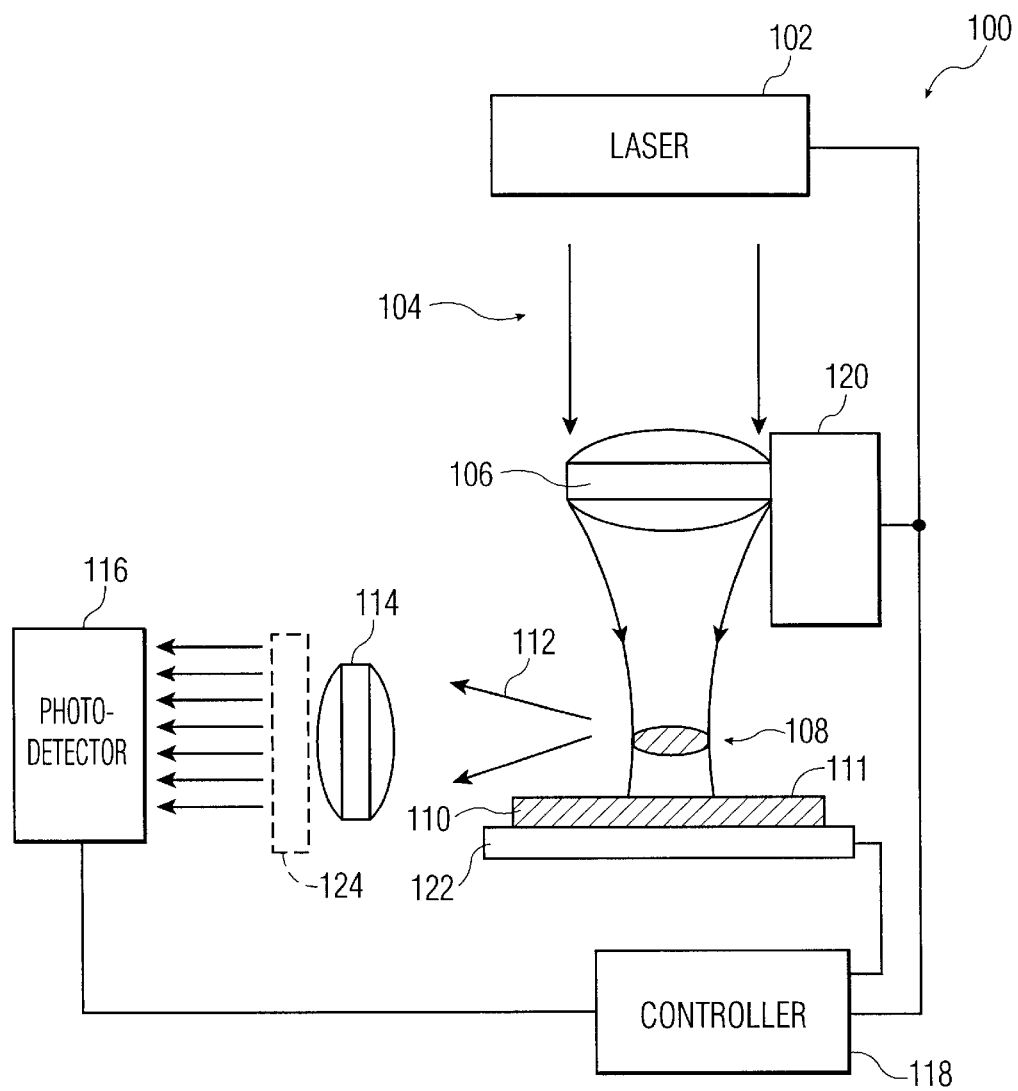
FIG. 1 is a laser focusing apparatus according to an exemplary embodiment of the present invention.

Referring now to the drawing, in which like reference numerals refer to like elements throughout, FIG. 1 shows a laser focusing apparatus 100 according to an exemplary embodiment of the present invention. A laser 102 generates a laser beam 104. In an exemplary embodiment, the laser beam 104 is an ultrashort pulse laser beam. The laser focusing apparatus 100 focuses the laser beam 104 relative to a workpiece 110. The workpiece 110 has a workpiece surface 111. The focused laser beam 104 may then be used for precision machining of the workpiece 110, for example.

The laser beam 104 is directed to a focusing lens 106. The focusing lens 106 focuses the laser beam 104 to a focal point of heightened laser power density. A plasma 108 is formed at the focal point. In the exemplary embodiment illustrated in FIG. 1, the laser 102 provides an ultrafast laser beam 104 with a pulse duration in the picosecond and femtosecond range. The high peak intensity of the ultrafast laser, when focused, may ionize air to generate a visible plasma spark 108 in the focal region.

In an exemplary embodiment, this plasma 108 is formed at a focal point in an atmosphere including air above the workpiece 110. The laser 102 may be a titanium doped sapphire laser (Ti:sapphire) having a wavelength of 800 nm, a pulse width of 150 fs, and a pulse energy of 1 mJ (peak power of $10^{-3} J/150 \times 10^{-15} sec = 6.7$ GW), for example.

The plasma 108 generates an plasma emission 112. The plasma emission 112 is directed by a directing lens 114 to a photodetector 116. In this exemplary embodiment, the photodetector 116 detects the intensity of the plasma emission 112. In an exemplary embodiment, the photodetector 116 is a CCD camera.

In an exemplary embodiment, the apparatus 100 includes a filter 124 for filtering the plasma emission 112 before it is detected by the photodetector 116. The filter 124 may be a bandpass color filter to transmit light having a wavelength of the plasma emission 112 and block light having a wavelength of the laser beam 104.

A workpiece actuator 122 or a focusing lens actuator 120 may be used to adjust the positions of the workpiece 110 and the focusing lens 106, respectively. A controller 118 may adjust the position of the focal point of the focused laser beam 104 based on the intensity of the plasma 108. The controller 118 may adjust the focal point of the laser beam 104 by adjusting one or both of a workpiece actuator 122 and a focusing lens actuator 120.

Figure 2A:
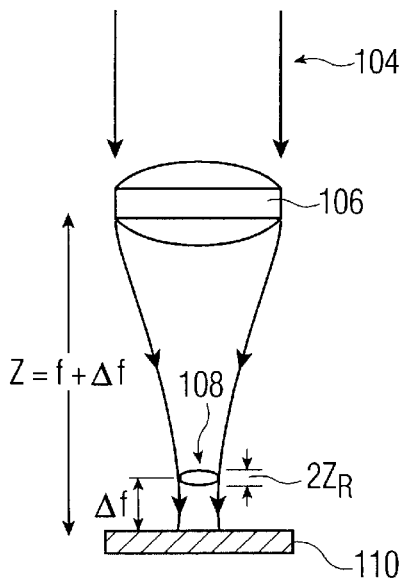
FIGS. 2A–2C illustrate variations in the position of a focal point relative to a workpiece as the distance between a focusing lens and the workpiece varies.
Figure 2B:
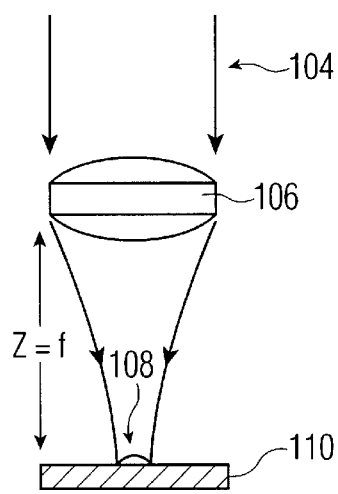
Figure 2C:
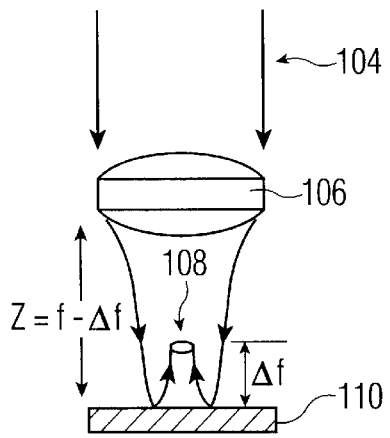

The controller 118 may adjust the position of the focal point to be above the workpiece 110 as shown in FIGS. 1 and 2A, on the workpiece 110 as shown in FIG. 2B, and below the workpiece 110 as shown in FIG. 2C. In FIGS. 2A–2C, Z is the distance from the focusing lens 106 to the workpiece 110, f is the focal length, Δf is a distance by which Z differs from f, and $2Z_R$ is the width of the plasma 108.

In FIG. 2A, because Z is greater than the focal length f by an amount Δf, the focal point and the plasma 108 are above the workpiece 110. In FIG. 2B, because Z is equal to the focal length f, the focal point and the plasma 108 are on the workpiece 110. In FIG. 2C, because Z is less than the focal length f by an amount Δf, the focal point is below the workpiece 110. In FIG. 2C, the plasma 108 is formed a distance Δf above the workpiece 110 because the focused laser beam 104 is reflected by the workpiece 110.

Figure 3:
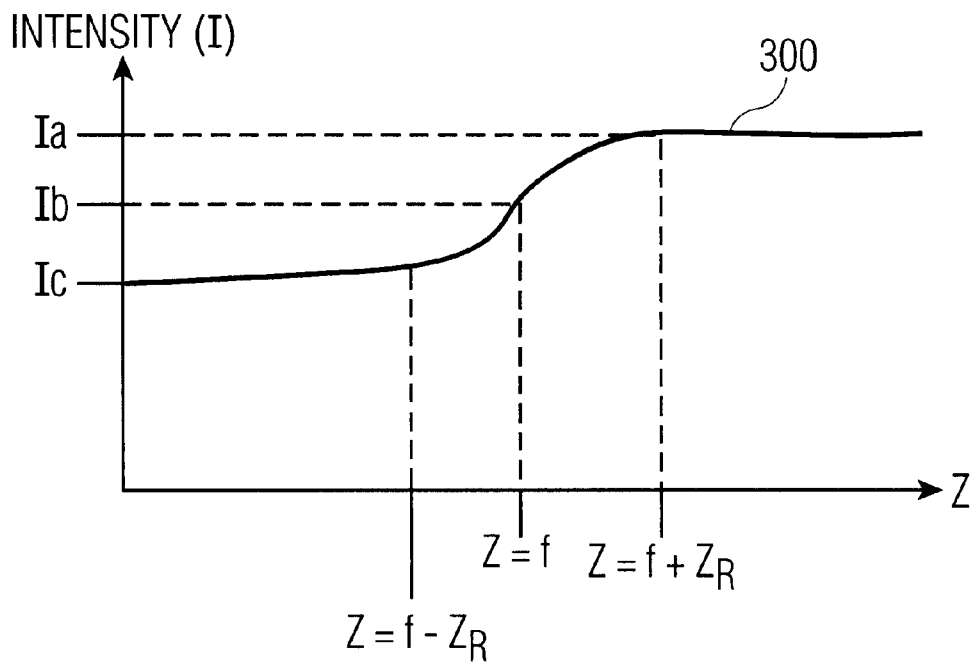
FIG. 3 shows a curve of the intensity of a plasma image as the distance between a focusing lens and a workpiece varies.

With reference to FIG. 3, variation of the intensity I of the plasma emission 112 as the distance Z from the focusing lens 106 to the workpiece 110 varies, is described. When the distance Z between the focusing lens 106 and the workpiece 110 is greater than $f+Z_R$ ($Z>f+Z_R$), the intensity I of the plasma emission 112 is $I_a$ and the plasma 108 is formed in an atmosphere above the workpiece.

As the distance Z between the focusing lens 106 and the workpiece 110 is reduced, the intensity I of the plasma emission 112 will decrease when the plasma contacts the workpiece 110. The plasma will begin to contact the workpiece 110 when $Z=f+Z_R$. The intensity I will decrease as the distance Z is further reduced until $Z=f-Z_R$. The intensity I curve 300 has a point of inflection at an intensity $I_b$ where Z=f. The intensity I for $f-Z_R<Z<f+Z_R$ is partially contributed by a direct emission of the plasma and partially contributed by a plasma emission reflected off the workpiece 110. The intensity $I_b$ at the Z=f may be approximately modeled by the following equation: $I_b=(I_a/2)+(RI_a/2)$ where R is the reflectivity of the workpiece 110.

As shown in FIG. 3, when $Z<f-Z_R$, the intensity I of the plasma emission 112 is Ic ($<$Ia) and the plasma 108 is formed in an atmosphere above the workpiece 110. When the distance Z is less than $f-Z_R$, the laser beam 104 is reflected off the workpiece 110 and the plasma is formed in an atmosphere above the workpiece 110 due to the reflected beam as illustrated in FIG. 2C. The intensity $I_c$ may be approximately modeled by the following equation: $I_c=RI_a$.

Figure 4:
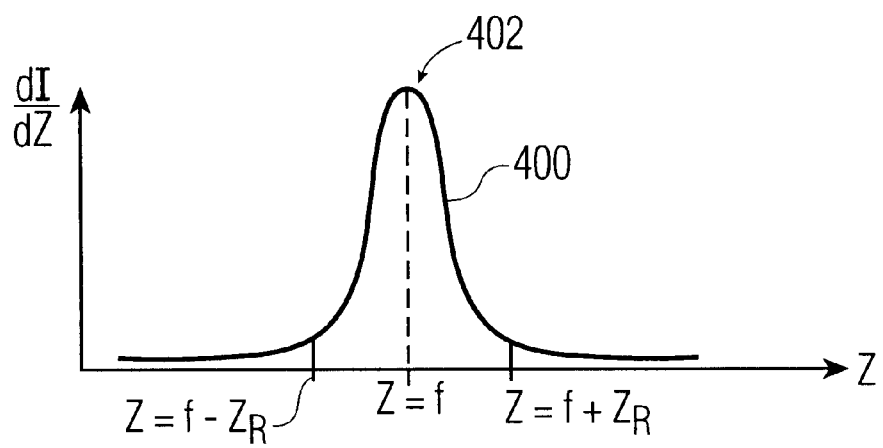
FIG. 4 shows a curve of the derivative of the intensity curve of FIG. 3.

FIG. 4 shows a curve 400 representing the derivative of the intensity I curve 300 of FIG. 3 taken with respect to Z. The curve 400 has a maximum 402 at Z=f. The apparatus of FIG. 1 may be used to adjust the distance Z back and forth between $Z=f+Z_R$ and $Z=f-Z_R$ to form curves 300 and 400 and identify the position Z=f from curve 400 for adjusting the distance between the focusing lens 106 and the workpiece 110.

In an exemplary embodiment, the focused laser beam 104 has an intensity I less than an intensity which would damage the workpiece 110. This allows the controller to adjust the focal point to a desired position on the workpiece 110 without damaging the workpiece 110. The intensity of the laser beam 104 may then be increased once the focal point is in the desired position to machine the workpiece 110, for example.

Figure 5:
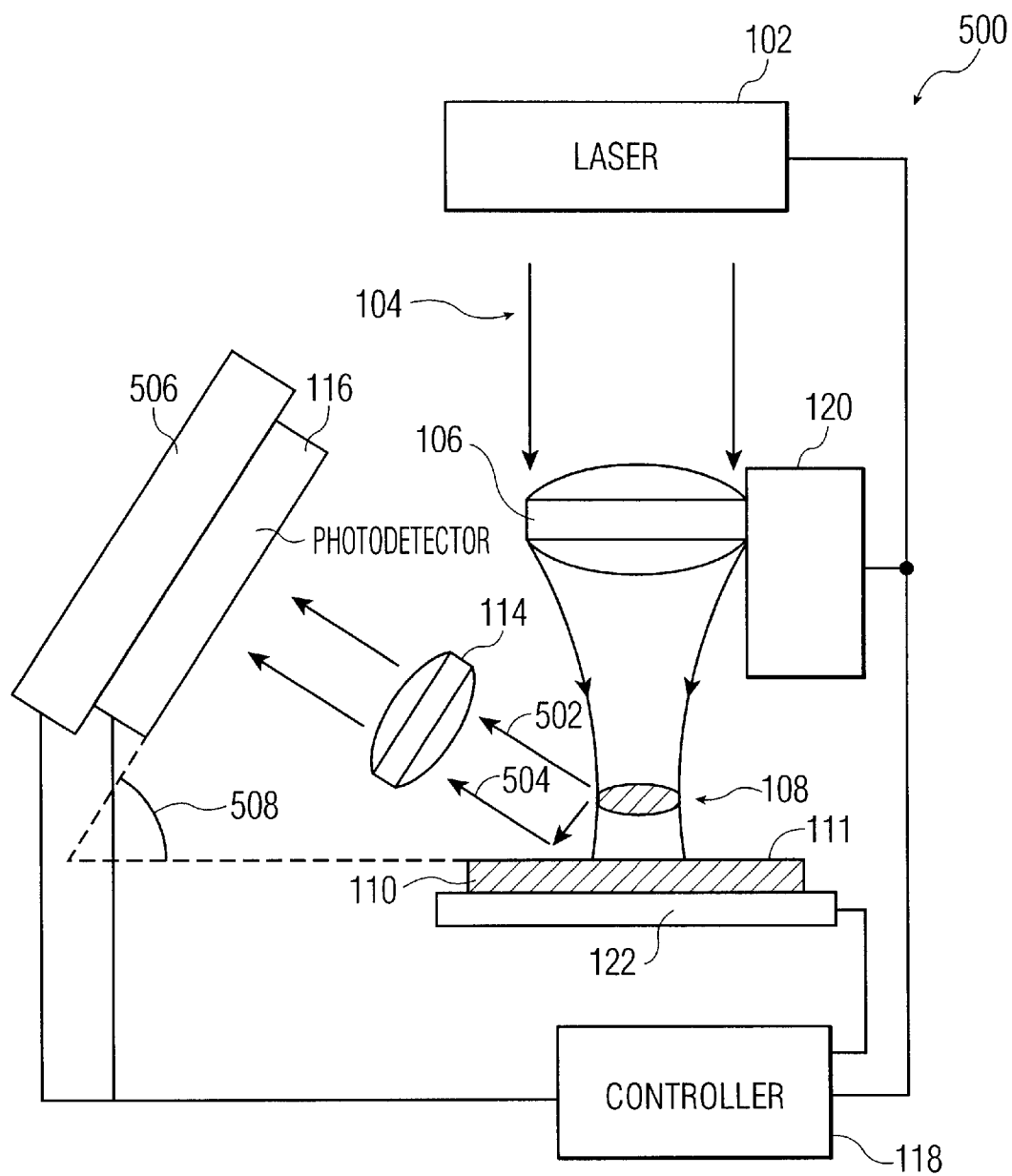
FIG. 5 shows a laser focusing apparatus according to another exemplary embodiment of the present invention.

FIG. 5 is a laser focusing apparatus 500 according to another exemplary embodiment of the present invention. The controller 118 may control an actuator 506 to control the position of the photodetector 116. The vertical position, the distance from the workpiece 110, and the angle 508 of the photodetector 116 and directing lens 114 with respect to the surface 111 of the workpiece 110, may be adjusted by the actuator 506.

The photodetector 116 and directing lens 114 are illustrated in FIG. 5 at an angle 508 with respect to the surface 111 of the workpiece 110. In an exemplary embodiment, actuator 506 orients the photodetector 116 at an angle ranging from 20 to 50 degrees with respect to the plane of the surface 111 of the workpiece 110. In another exemplary embodiment, the actuator 506 orients the photodetector 116 an angle of 45 degrees with respect to the plane of the surface 111 of the workpiece 110.

The controller 118 may be configured to control the actuator 506 to vary the position of the photodetector 116 and of the directing lens 114 as the intensity and the position of the plasma 108 vary. For example, the position of the photodetector 116 and directing lens 114 may be adjusted for greatest sensitivity to intensity variations. This position may vary depending on the position of the plasma. With regard to FIGS. 6, 7A, and 7B, discussed below, the photodetector 116 and directing lens 114 may similarly be adjusted for greatest sensitivity to distance or shape variations between a primary and reflected image of the plasma.

In the exemplary embodiment shown in FIG. 5, the plasma 108 forms a primary emission 502 and a reflected emission 504. The reflected emission 504 is caused by the reflection of the plasma emission from the workpiece 110. In an exemplary embodiment, the workpiece surface is coated by a reflective material such as gold or aluminum or is a polished surface. The primary emission 502 may form a primary image detected by the photodetector 116 and the reflected emission 504 may form a reflected image detected by the photodetector 116.

The photodetector 116 and the controller 118 may be configured to detect respective intensities of the primary and reflected images. A difference in intensity between the primary and reflected images may be caused by the different distance traveled by each image. For example, the primary image is formed by a direct emission from the plasma to the photodetector while the reflected image travels a longer distance by being directed first to the workpiece 110 and then being reflected to the photodetector 116. In an exemplary embodiment, the intensities are modeled as being proportional to $1/d^2$ where d is the distance the emission has traveled from the plasma to the photodetector 116.

Figure 6:
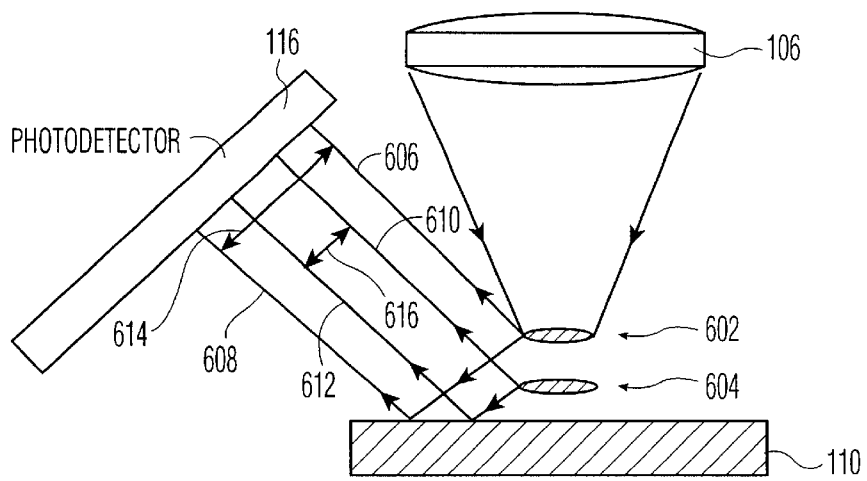
FIG. 6 illustrates a method of adjusting the focal point responsive to the distance between a primary image and a reflected image as the distance between the focal point and the workpiece varies.

As shown in FIG. 6, the photodetector 116 and the controller 118 may be configured to detect a distance between the primary and reflected images. A first plasma 602 is formed using a focusing lens 106. A second plasma 604 may be formed by moving decreasing the distance between the focusing lens 106 and the workpiece 110. A shown, the first plasma 602 is further away from the workpiece 110 than the second plasma 604. The first plasma 602 generates a primary emission 606 and a reflected emission 608 which form primary and reflected images detected by the photodetector, respectively. The second plasma 604 generates a primary emission 610 and a reflected emission 612 which form primary and reflected images detected by the photodetector, respectively. As illustrated in FIG. 6, the distance 614 between the primary and reflected images generated by the first plasma 602 is greater than the distance 616 between the primary and reflected images generated by the second plasma 604. A decrease in distance between the primary and reflected images indicates that the focal point is approaching the workpiece 110. Thus, a controller 118 may adjust the position of the focal point responsive to differences in distance between the primary and reflected images.

For example, a plasma may initially be formed above the workpiece ($Z>f+Z_R$). As described above, primary and reflected images of the plasma may be detected. The distance between the focusing lens 106 and the workpiece 110 may then be adjusted to move the plasma closer to the workpiece. As the plasma moves closer to the workpiece, the primary and reflected images of the plasma, as detected by the photodetector 116, move closer together. The position where Z=f may be identified as the position where the primary and reflected images merge into a single image.

Figure 7A:
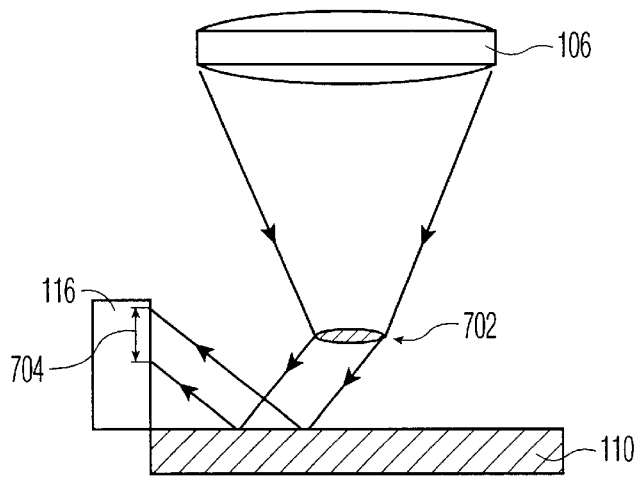
FIGS. 7A and 7B illustrate a method of adjusting the focal point responsive to the difference in shape of plasma images as the distance between the focal point and the workpiece varies.
Figure 7B:
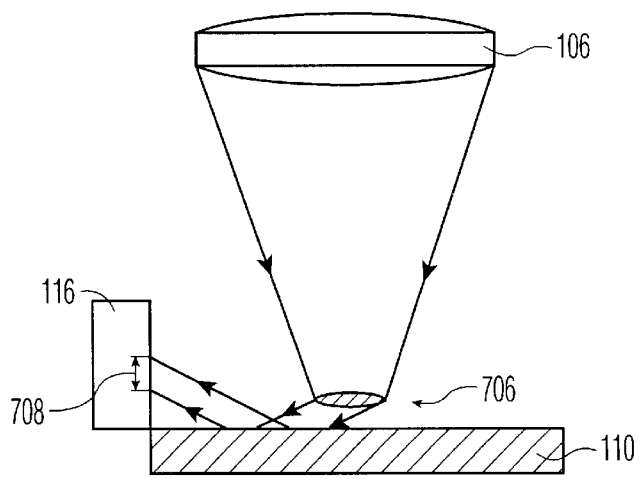

FIGS. 7A and 7B illustrate a difference in images detected by the photodetector 116 as the distance between a plasma and the workpiece 110 varies. The plasma 702 in FIG. 7A is further from the workpiece than the plasma 706 in FIG. 7B. The same shaped plasma in FIGS. 7A and 7B will result in differences in the shape of the image detected by the photodetector 116. For example, the reflected image of the plasma 702 in FIG. 7A will result in the photodetector 116 detecting an image of the plasma 702 having a length 704. The reflected image of the plasma 706 in FIG. 7B will result in the photodetector 116 detecting an image of the plasma 706 having a length 708. As shown by FIGS. 7A and 7B, the shape of the reflected image of plasma 706 is compressed compared to the image of the reflected image of plasma 702. Thus, the controller may adjust the position of the focal point responsive to the differences in shape between the primary and reflected images of the plasma. The controller also may adjust the focal point responsive to the differences in shape between primary images as the distance between the plasma and the workpiece varies and the differences in shape between reflected images as the distance between the plasma and the workpiece varies.

The present invention is not limited to a particular size of a photodetector nor to a particular number of photodetectors. A large photodetector may be used to detect both primary and reflected images of a plasma. Alternatively, one photodetector may detect the primary image while another photodetector detects the reflected image of a plasma.

An apparatus and method according present invention may be used to adjust the focal point of a laser beam before machining and to dynamically adjust the focal point of a laser beam while machining. This allows for accurate machining of a workpiece as the depth of machining into the workpiece varies and for accurate machining despite non-uniformities in the surface of the workpiece. For example, if the laser is used to ablate a workpiece 110, for a fixed focal point, the intensity of the plasma may increase as the material at the focal point is ablated. The focal point may then be adjusted deeper into the workpiece 110.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method for focusing a laser relative to a workpiece comprising the steps of:
   (a) generating a laser beam;
   (b) focusing the laser beam to a focal point to form a plasma;
   (c) detecting an intensity of the plasma formed by the focused laser beam; and
   (d) adjusting a position of the focal point relative to the workpiece responsive to the detected intensity of the plasma.

2. A method according to claim 1 wherein step (b) includes focusing the laser beam to a focal point in an atmosphere above the workpiece.

3. A method according to claim 1 wherein steps (a) and (b) include generating and focusing the laser beam wherein the focused laser beam has an intensity less than an intensity which would damage the workpiece.

4. A method according to claim 1 wherein step (c) includes the step of directing an image of the plasma formed by the focused laser beam to a photodetector for detecting the intensity of the plasma.

5. A method according to claim 4 wherein step (c) includes the step of filtering the image directed to the photodetector to block light having a wavelength equal to a wavelength of light of the laser beam.

6. A method according to claim 4 wherein the workpiece has a surface oriented in a plane and the photodetector is oriented at an angle to the plane and the method includes the step of adjusting the angle of the photodetector as the position of the focal point is adjusted relative to the workpiece surface responsive to the detected intensity of the plasma.

7. A method according to claim 1 wherein
   step (c) includes the step of detecting a primary image of the plasma and detecting a reflected image of the plasma, and
   step (d) includes the step of adjusting the position of the focal point relative to the workpiece responsive to at least one of the respective intensities of the primary and reflected images, a distance between the primary and reflected images, and respective shapes of the primary and reflected images.

8. A method according to claim 1 wherein
   step (a) includes genera ting an ultrashort pulse laser beam;
   step (b) includes focusing the ultrashort pulse laser beam to the focal point to form the plasma; and
   step (c) includes detecting the intensity of the plasma formed by the focused ultrashort pulse laser beam.

9. A method for focusing a laser relative to a surface of a workpiece comprising the steps of:
   (a) generating a laser beam;
   (b) focusing the laser beam to a focal point in an atmosphere above the workpiece to form a plasma, wherein the focused laser beam has an intensity less than an intensity which would damage the workpiece;
   (c) directing an image of the plasma formed by the focused laser beam to a photodetector for detecting a primary image of the plasma and detecting a reflected image of the plasma;
   (d) adjusting the position of the focal point relative to the workpiece responsive to at least one of the respective intensities of the primary and reflected images, a distance between the primary and reflected images, and respective shapes of the primary and reflected images.

* * * * *